(12) United States Patent
Liu (10) Patent No.: US 12,028,938 B2
(45) Date of Patent: Jul. 2, 2024

(54) DATA PROCESSING AND COMMUNICATION METHODS, MEMORY, COMMUNICATION TERMINAL, APPARATUS, AND DEVICE

(71) Applicant: ZTE Corporation, Shenzhen (CN)

(72) Inventor: Chengfang Liu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 336 days.

(21) Appl. No.: 17/442,995

(22) PCT Filed: Oct. 19, 2020

(86) PCT No.: PCT/CN2020/121898
§ 371 (c)(1),
(2) Date: Sep. 24, 2021

(87) PCT Pub. No.: WO2021/078097
PCT Pub. Date: Apr. 29, 2021

(65) Prior Publication Data
US 2022/0174785 A1  Jun. 2, 2022

(30) Foreign Application Priority Data
Oct. 21, 2019 (CN) .......................... 201910998720.4

(51) Int. Cl.
*H04W 88/06* (2009.01)
(52) U.S. Cl.
CPC .................................. *H04W 88/06* (2013.01)
(58) Field of Classification Search
CPC ..... H04W 88/06; H04W 88/04; H04W 76/20; H04M 1/02; H04B 1/401
See application file for complete search history.

(56) References Cited

U.S. PATENT DOCUMENTS

| 2015/0199946 A1* | 7/2015 | Kato ........................ H04N 7/15 348/14.12 |
| 2016/0363931 A1 | 12/2016 | Yang |
| 2018/0047229 A1* | 2/2018 | Hyde .................. A61B 5/6833 |

FOREIGN PATENT DOCUMENTS

| CN | 202738119 U | 2/2013 |
| CN | 206379967 U | 8/2017 |

(Continued)

OTHER PUBLICATIONS

International Searching Authority. International Search Report and Written Opinion for CN Application No. PCT/CN2020/121898 and English translation, dated Jan. 20, 2021, pp. 1-10.

(Continued)

*Primary Examiner* — Ankur Jain
(74) *Attorney, Agent, or Firm* — Vivacqua Crane, PLLC (57) ABSTRACT

A data processing method, a communication method, a memory, a communication terminal, a communication apparatus, and a communication device are disclosed. The data processing method may include: obtaining uplink data of a communication terminal and controlling the communication terminal to turn off a communication module thereof configured to receive or transmit a first network signal which is an M-th generation mobile communication network signal (S101); and transmitting the uplink data to a communication device externally connected to the communication terminal, and transmitting downlink data received by the communication device to the communication terminal (S102), where the communication device is configured to receive or transmit a second network signal which is an N-th generation mobile communication network signal, where N>M, and N and M are both positive integers.

19 Claims, 4 Drawing Sheets

Obtain uplink data of a communication terminal and control the communication terminal to turn off a communication module thereof configured to receive or transmit a first network signal — S101

Transmit the uplink data to a communication device externally connected to the communication terminal, and transmit downlink data received by the communication device to the communication terminal — S102

(56) References Cited

FOREIGN PATENT DOCUMENTS

| | | |
|---|---|---|
| CN | 108494612 A | 9/2018 |
| CN | 109842679 A | 6/2019 |

OTHER PUBLICATIONS

The State Intellectual Property Office of People's Republic of China. Office Action for CN Application No. 201910998720.4 and English translation, dated Jan. 19, 2023, pp. 1-10.

* cited by examiner

| Control, in response to a connection signal of a communication device, a processor to execute an application program which is configured to, when executed, implement a data processing method | —S301 |

DATA PROCESSING AND COMMUNICATION METHODS, MEMORY, COMMUNICATION TERMINAL, APPARATUS, AND DEVICE

CROSS-REFERENCE TO RELATED APPLICATION

This application is a national stage filing under 35 U.S.C. § 371 of international application number PCT/CN2020/121898, filed Oct. 19, 2020, which claims priority to Chinese patent application No. 201910998720.4 filed on Oct. 21, 2019. The contents of these applications are incorporated herein by reference in their entirety.

TECHNICAL FIELD

The present disclosure relates to the field of communications, and in particular to a data processing method, a communication method, a memory, a communication terminal, a communication device, and a communication apparatus.

BACKGROUND

The fifth generation mobile communication technology, namely 5th generation mobile networks, 5th generation wireless systems, or 5th-Generation (5G for short), is the latest generation of cellular mobile communication technology. The performance goals of 5G are high data rates, lower latency, reduced energy consumption, lower costs, enhanced system capacity and massive machine-type communication. At present, as the penetration rate of 5G mobile phones is still very low, most users are still using 4G or even 3G mobile phones, so that one needs to replace his/her mobile phone before he/she can experience the speed of 5G networks. However, many users have become accustomed to their original mobile phones, and simply replacing the mobile phones may bring higher costs.

SUMMARY

In view of this, in order to solve the above technical problems at least to a certain extent, embodiments of the present disclosure provide a data processing method, a communication method, a memory, a communication terminal, a communication device, and a communication apparatus. In the embodiments of the present disclosure, the communication terminal may perform communication in a 5G network with the aid of the communication device, so that the communication terminal itself does not need to be replaced and the use cost is reduced.

In accordance with an aspect of the present disclosure, an embodiment provides a data processing method, which may include: obtaining uplink data of a communication terminal and controlling the communication terminal to turn off a communication module of the communication terminal, where the communication module is configured to receive or transmit a first network signal which is an M-th generation mobile communication network signal; and transmitting the uplink data to a communication device externally connected to the communication terminal, and transmitting downlink data received by the communication device to the communication terminal, where the communication device is configured to receive or transmit a second network signal which is an N-th generation mobile communication network signal, where N>M, and N and M are both positive integers.

In some examples, before the step of obtaining uplink data of a communication terminal and controlling the communication terminal to turn off a communication module of the communication terminal, where the communication module is configured to receive or transmit a first network signal, the data processing method may further include: sending a network signal application request, and performing, in response to a reception of a second network signal application instruction, the step of obtaining uplink data of a communication terminal and controlling the communication terminal to turn off a communication module of the communication terminal, where the communication module is configured to receive or transmit a first network signal.

In some examples, the data processing method may further include: controlling, in response to a power-on instruction, a power supply of the communication terminal to supply power to the communication device externally connected to the communication terminal.

In some examples, the data processing method may further include: controlling, in response to a power-off instruction, a power supply of the communication terminal to stop supplying power to the communication device externally connected to the communication terminal.

In accordance with an aspect of the present disclosure, an embodiment provides a communication method applicable to a communication terminal comprising a processor and an application program, the communication method may include: controlling, in response to a connection signal of a communication device, the processor to execute the application program which, when executed by the processor, causes the processor to perform a data processing method as described above.

In some examples, the communication method may further include: downloading and installing the application program locally in response to the connection signal of the communication device being received for the first time.

In accordance with an aspect of the present disclosure, an embodiment provides a memory storing an application program which, when executed by a processor, implements a data processing method as described above.

In accordance with an aspect of the present disclosure, an embodiment provides a communication terminal, which may include: an external data interface, a controller, a processor, and a memory as described above, where the external data interface is configured to be connected to an external communication device, and the controller is configured to control, in response to a connection signal of the communication device, the processor to execute the application program.

In accordance with an aspect of the present disclosure, an embodiment provides a communication device, which may include: a data transfer interface, a baseband processing module and an antenna module, where the data transfer interface is configured to be connected to an external data interface of a communication terminal as described above and to transfer data with the external data interface; uplink data of the communication terminal may include: information of a communication card, and data to be transferred; the baseband processing module is configured to perform, according to the information of the communication card, baseband processing on the data to be transferred, to transfer the processed data to the antenna module, and to transfer downlink data received by the antenna module to the data transfer interface after the downlink data is subjected to baseband processing; and the antenna module is configured to communicate with a base station by means of the second network signal.

In some examples, the communication device may further include: a cache module configured to cache data to be transferred to the data transfer interface from the baseband processing module.

In some examples, the communication device may further include: a notification module configured to issue a notification signal when the communication device is in a communication state.

In accordance with an aspect of the present disclosure, an embodiment provides a communication apparatus, which may include: a communication terminal as described above and a communication device as described above, where the external data interface of the communication terminal is detachably coupled to the data transfer interface of the communication device.

BRIEF DESCRIPTION OF DRAWINGS

The accompanying drawings are used to provide a further understanding of the present disclosure and constitute a part of the specification, and together with the following detailed description, serve to explain the present disclosure, but do not constitute a limitation of the present disclosure. In the accompanying drawings.

DETAILED DESCRIPTION

Specific embodiments of the present disclosure will be described in detail with reference to the accompanying drawings. It should be understood that the specific embodiments described herein are only used to illustrate and explain the present disclosure, and are not used to limit the present disclosure.

Figure 1:
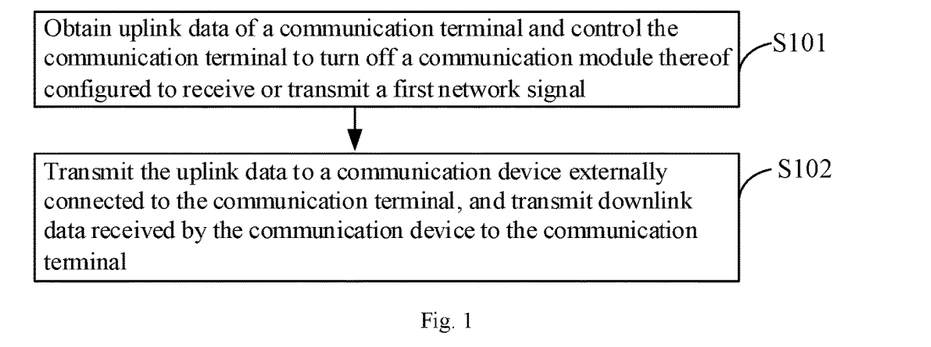
FIG. 1 is a schematic diagram of a data processing method provided by an embodiment of the present disclosure.

In accordance with an aspect of the present disclosure, an embodiment provides a data processing method, which can be executed by a processor of a communication terminal. FIG. 1 is a schematic diagram of a data processing method provided by an embodiment of the present disclosure. As shown in FIG. 1, the data processing method includes the following steps.

At step S101, uplink data of a communication terminal is obtained, and the communication terminal is controlled to turn off a communication module thereof configured to receive or transmit a first network signal. The first network signal is an M-th generation mobile communication network signal.

The communication terminal may be a mobile terminal such as a mobile phone. A communication module of the communication terminal is a module of the communication terminal itself that is used for communication, and may specifically include a baseband chip and an antenna.

The uplink data of the communication terminal may include: information of a communication card (i.e., a mobile phone card) and data to be transferred. The data to be transferred may include various data request instructions to be transmitted to a base station from the communication terminal, and may further include data collected by a call module, a camera module, a recording module and a storage module in the communication terminal.

At step S102, the uplink data is transmitted to a communication device externally connected to the communication terminal, and downlink data received by the communication device is transmitted to the communication terminal. The communication device is configured to receive or transmit a second network signal, such that the communication terminal can communicate with the base station over a second network with the aid of the communication device. The second network signal is an N-th generation mobile communication network signal, where N>M, and N and M are both positive integers. In the embodiment of the present disclosure, the second network signal is a 5G network signal and the first network signal is a 3G or 4G network signal as an example for description.

The communication device is a device which can be separated from the communication terminal. The communication device may be externally connected to the communication terminal via a data interface, and when the communication device is externally connected to the communication terminal, data transfer can be performed between the communication device and the communication terminal. When there is no need for data transfer between the communication device and the communication terminal, the communication device can be disconnected from the communication terminal.

The downlink data received by the communication device may include: data sent to the communication terminal according to a data download instruction of the communication terminal, for example, video data to be downloaded to the communication terminal.

In the data processing method provided by the embodiment of the present disclosure, the communication terminal is controlled to turn off a communication module thereof configured to receive or transmit a first network signal, and transmit the uplink data to a communication device externally connected to the communication terminal, and downlink data received by the communication device is transmitted to the communication terminal, such that the communication terminal can receive or transmit a second network signal by means of the communication device externally connected thereto. Therefore, a communication terminal that does not have the 5G network communication function can perform communication in the 5G network with the aid of a communication device, and a user can experience the 5G network without replacing the communication terminal, thereby reducing the cost.

Figure 2:
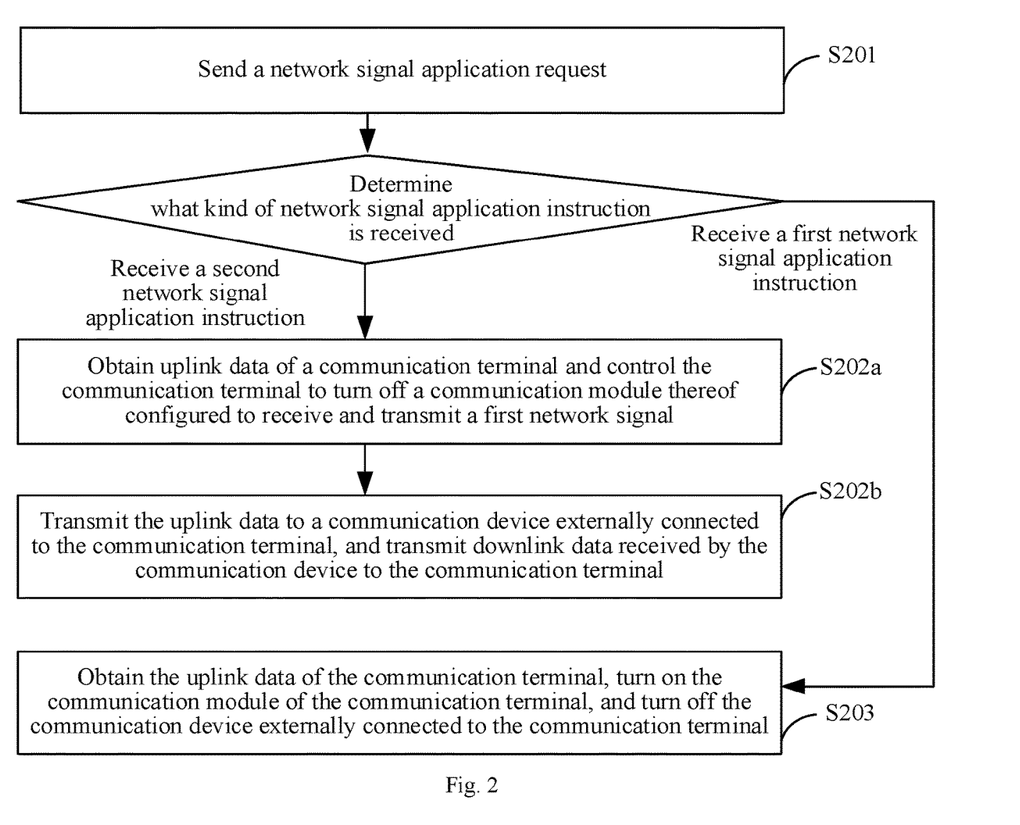
FIG. 2 is a schematic diagram of another data processing method provided by an embodiment of the present disclosure.

FIG. 2 is a schematic diagram of another data processing method provided by an embodiment of the present disclosure. As shown in FIG. 2, the data processing method may include the following steps.

At step S201, a network signal application request is sent out. The network signal application request is configured to request a first network signal application instruction/a second network signal application instruction, where the first network signal application instruction is an instruction to determine the use of the first network signal for communication, and the second network signal application instruction is an instruction to determine the use of the second network signal for communication. In a specific application example, the network signal application request may be: determining whether to use a 5G network signal.

In response to a reception of the second network signal application instruction, steps S202a and S202b are executed. In response to a reception of the first network signal application instruction, step S203 is executed. The first network signal application instruction is an instruction to determine the use of the first network signal for communication, and the second network signal application instruction is an instruction to determine the use of the second network signal for communication. The first network signal application instruction and the second network signal application instruction may be input by a user.

At step S202a, uplink data of a communication terminal is obtained, and the communication terminal is controlled to turn off a communication module thereof configured to receive or transmit a first network signal.

At step S202b, the uplink data is transmitted to a communication device externally connected to the communication terminal, and downlink data received by the communication device is transmitted to the communication terminal.

At step S203, the uplink data of the communication terminal is obtained, the communication module of the communication terminal is turned on, and the communication device externally connected to the communication terminal is turned off, such that the communication terminal can perform communication by using the first network signal.

In one embodiment, the data processing method further includes: controlling, in response to a power-on instruction, a power supply of the communication terminal to supply power to the communication device externally connected to the communication terminal, so as to ensure the normal operation of the communication device.

The power-on instruction may be an instruction input by a user or an instruction generated in response to the second network signal application instruction.

In one embodiment, the data processing method further includes: controlling, in response to a power-off instruction, a power supply of the communication terminal to stop supplying power to the communication device externally connected to the communication terminal, so as to turn off the communication device. The power-off instruction may be an instruction input by a user or an instruction generated in response to the first network signal application instruction.

Figure 3:
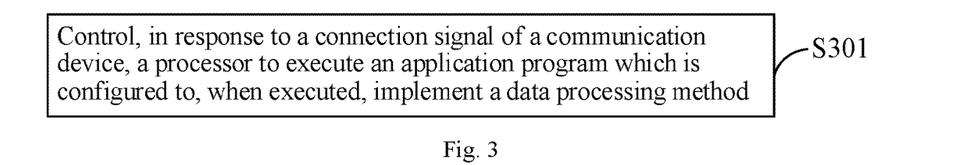
FIG. 3 is a flowchart of a communication method applicable to a communication terminal provided by an embodiment of the present disclosure.

In accordance with an aspect of the present disclosure, an embodiment provides a communication method applicable to a communication terminal comprising a processor and an application program. FIG. 3 is a flowchart of the communication method applicable to a communication terminal provided by the embodiment of the present disclosure. As shown in FIG. 3, the communication method includes the following steps.

At step S301, in response to a connection signal of a communication device, the processor is controlled to execute the application program which, when executed by the processor, causes the processor to perform a data processing method in the above embodiments.

The connection signal of the communication device is a signal indicating that the communication device is connected to the communication terminal. The signal may be generated after detecting the status of the external data interface of the communication terminal.

In the communication method provided by the embodiment of the present disclosure, when a communication device is connected to a communication terminal, a processor executes an application program, such that the communication terminal is controlled to turn off the communication module thereof configured to receive or transmit a first network signal, and transmit the uplink data to a communication device externally connected to the communication terminal, and downlink data received by the communication device is transmitted to the communication terminal, such that the communication terminal can receive or transmit a second network signal by means of the communication device externally connected thereto. Therefore, a communication terminal that does not have the 5G network communication function can perform communication in the 5G network with the aid of a communication device, and a user can experience the 5G network without replacing the communication terminal, thereby reducing the cost.

In one embodiment, the communication method further includes: downloading and installing the application program locally in response to the connection signal of the communication device being received for the first time.

Figure 4:
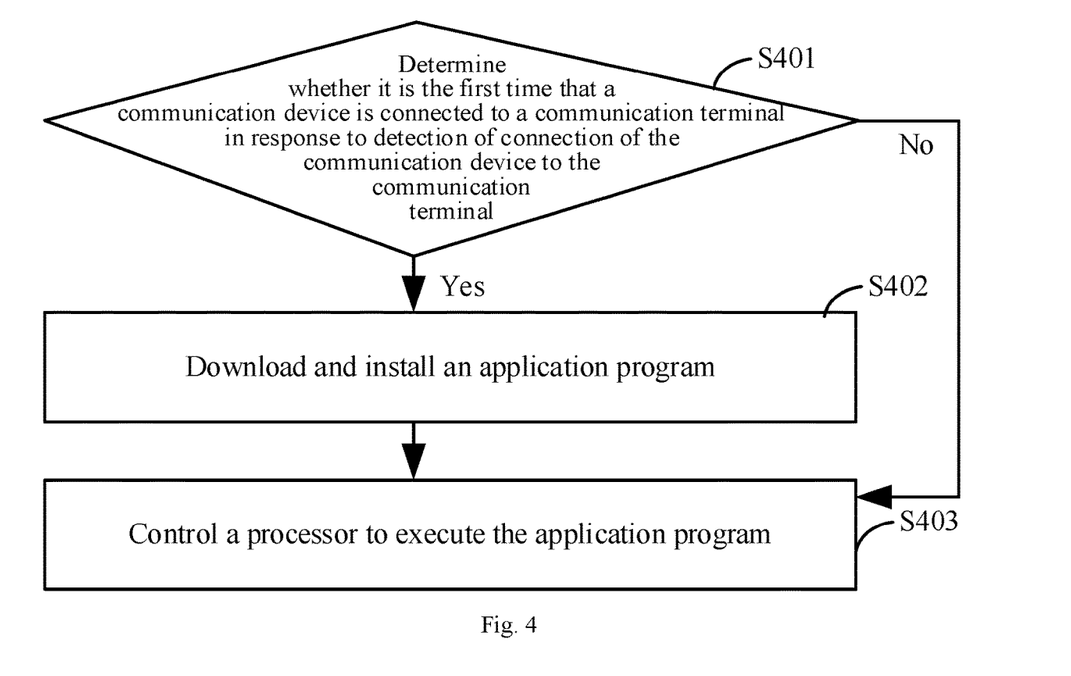
FIG. 4 is a flowchart of another communication method provided by an embodiment of the present disclosure.

FIG. 4 is a flowchart of another communication method provided by an embodiment of the present disclosure. As shown in FIG. 4, the communication method includes the following steps.

At step S401, when it is detected that a communication device is connected to a communication terminal, a determination is made on whether it is the first time that the communication device is connected to the communication terminal, and if so, the process proceeds to step S402 in which an application program is downloaded and installed. Then, step S403 is performed, in which the processor is controlled to execute the application program which, when executed by the processor, causes the processor to perform the following procedures: sending a network signal application request, and controlling, in response to a reception of a second network signal application instruction, the communication terminal to turn off a communication module thereof configured to receive or transmit a first network signal; and obtaining uplink data of the communication terminal, transmitting the uplink data to the communication device externally connected to the communication terminal, and transmitting downlink data received by the communication device to the communication terminal. If it is not the first time that the communication terminal is connected to the communication terminal, the process directly proceeds to step S403.

In accordance with an aspect of the present disclosure, an embodiment provides a memory on which an application program is stored. The application program, when executed by a processor, implements a data processing method as described above.

Figure 5:
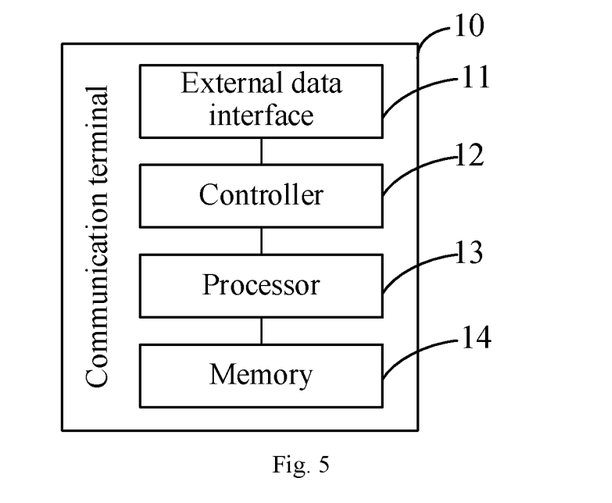
FIG. 5 is a schematic diagram of a communication terminal provided by an embodiment of the present disclosure.

In accordance with an aspect of the present disclosure, an embodiment provides a communication terminal. FIG. 5 is a schematic diagram of the communication terminal provided by the embodiment of the present disclosure. As shown in FIG. 5, the communication terminal 10 includes: an external data interface 11, a controller 12, a processor 13 and a memory 14 provided by the above embodiments. The external data interface 11 is configured to be connected to an external communication device, and the controller 12 is configured to control, in response to a connection signal of the communication device, the processor 13 to execute an application program, so as to implement a data processing method as described above. In the data processing method, uplink data transmitted to the communication device includes: information of a communication card, and data to be transferred. The data to be transferred may include various data request instructions to be transmitted to a base station from the communication terminal, and may further include data collected by a call module, a camera module, a recording module and a storage module in the communication terminal.

The external data interface 11 may be connected to the external communication device by connecting the communication device to the communication terminal in a plug-in manner.

Figure 6:
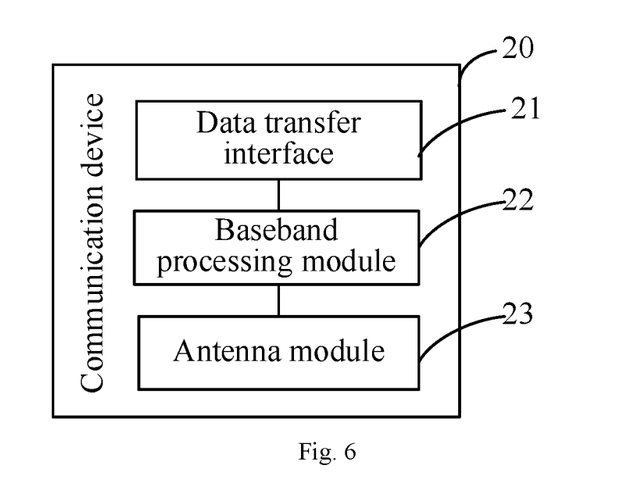
FIG. 6 is a schematic diagram of a communication device provided by an embodiment of the present disclosure.

In accordance with an aspect of the present disclosure, an embodiment provides a communication device. FIG. 6 is a schematic diagram of the communication device provided by the embodiment of the present disclosure. As shown in FIG. 6, the communication device 20 includes: a data transfer interface 21, a baseband processing module 22 and an antenna module 23.

The data transfer interface 21 is configured to be connected to an external data interface of a communication terminal as described above and to transfer data with the external data interface. The transfer protocol used for the data transfer between the data transfer interface 21 and the external data interface includes but is not limited to the Type-C protocol.

As mentioned above, uplink data of the communication terminal includes: information of a communication card, and data to be transferred. The baseband processing module 22 is configured to perform, according to the information of the communication card, baseband processing on the data to be transferred, to transfer the processed data to the antenna module 23, and to transfer downlink data received by the antenna module 23 to the data transfer interface 21 after the downlink data is subjected to baseband processing.

The antenna module 23 is configured to communicate with a base station by means of a second network signal.

The information of the communication card may include information needed for the communication terminal to interact with an operator. The baseband processing module 22 may specifically determine whether the communication card is registered in the second network according to the information of the communication card, and if so, the data to be transferred from the communication terminal is transferred to a base station by means of the antenna module 23.

As mentioned above, the second network signal is an N-th generation mobile communication network signal, and the communication terminal has a communication module configured to receive or transmit a first network signal, where N>M, and N and M are both positive integers. In the embodiment of the present disclosure, the second network signal is a 5G network signal and the first network signal is a 3G or 4G network signal as an example for description.

The communication device provided by the embodiment of the present disclosure may perform baseband processing on the data to be transferred from the communication terminal, and then transmit the processed data to the base station by means of the second network signal. The communication device may also receive data sent by the base station by means of the second network signal, and perform baseband processing on the received data before transmitting the data to the communication terminal. Therefore, a communication terminal that does not have the 5G network communication function can perform communication in the 5G network with the aid of a communication device, and a user can experience the 5G network without replacing the communication terminal, thereby reducing the cost.

Figure 7:
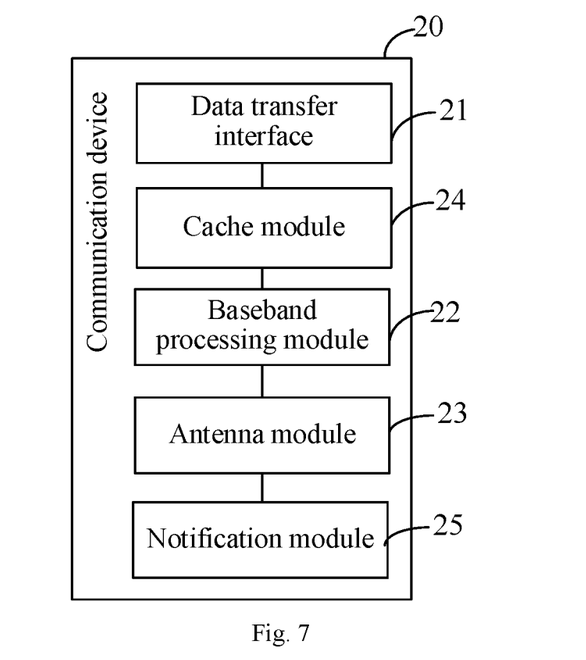
FIG. 7 is a schematic diagram of another communication device provided by an embodiment of the present disclosure.

FIG. 7 is a schematic diagram of another communication device provided by an embodiment of the present disclosure. Since the data transfer speed in the 5G network is relatively fast, while other data transfer protocols are relatively slow, in one embodiment, as shown in FIG. 7, the communication device 20 may further include a cache module 24. The cache module 24 is configured to cache the data to be transferred to the data transfer interface 21 from the baseband processing module 22.

In addition, the communication device 20 may further include: a notification module 25. The notification module 25 is configured to issue a notification signal when the communication device 20 is in a communication state. It should be understood that the fact that the communication device 20 is in a communication state means that the communication device 20 is running, that is, the antenna module 23 is in the process of communicating with the base station. Optionally, the notification module 25 may include an indicator lamp and thus provide notification by lighting the indicator lamp. Of course, the notification module 25 may also use other structures such as an audio player which provides notification through audio playback.

Figure 8:
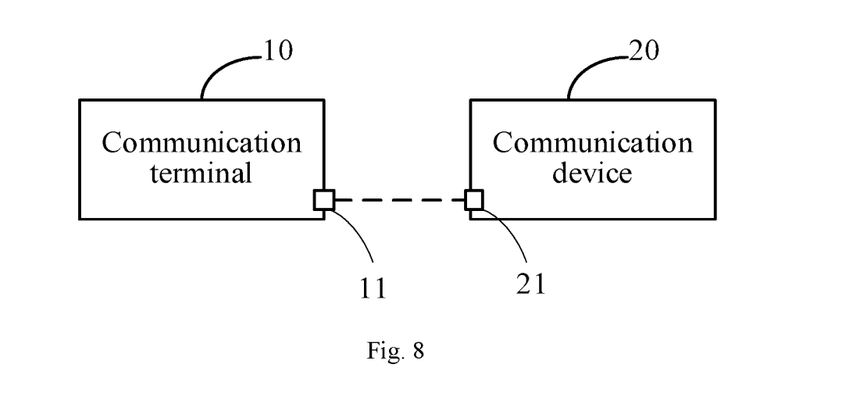
FIG. 8 is a schematic diagram of a communication apparatus provided by an embodiment of the present disclosure.

In accordance with an aspect of the present disclosure, an embodiment provides a communication apparatus. FIG. 8 is a schematic diagram of the communication apparatus provided by the embodiment of the present disclosure. As shown in FIG. 8, the communication apparatus includes: a communication terminal 10 and a communication device 20 in the above embodiments. An external data interface 11 of the communication terminal 10 is detachably coupled to a data transfer interface 21 of the communication device 20. The external data interface 11 may be coupled to the data transfer interface 21 in a plug-in manner.

Taking the first network signal being a 3G/4G network signal and the second network signal being a 5G network signal as an example, the communication process of the communication apparatus in the 5G network will be described below.

The communication device 20 is connected to the communication terminal 10. When the communication device 20 is connected to the communication terminal 10, a controller of the communication terminal 10 receives a connection signal of the communication device 20. If it is the first time that the controller receives a connection signal of the communication device 20, an application program is downloaded and installed, and a processor is then controlled to execute the application program. If it is not the first time that the controller receives a connection signal of the communication device 20, the controller controls the processor to execute the application program that has been installed already.

In the process of executing the application program, a network signal application request is sent out, and if a 5G network signal application instruction is received, the communication terminal 10 is controlled to turn off a communication module thereof configured to receive or transmit a 3G/4G network signal, and uplink data of the communication terminal 10 is obtained and transmitted to the communication device 20 externally connected to the communication terminal 10. The uplink data includes information of a communication card, and data to be transferred.

The communication device 20 determines whether the communication card is registered in the 5G network according to the information of the communication card; and if so, the data to be transferred from the communication terminal 10 is subjected to baseband processing and then uploaded to a base station, and downlink data transmitted from the base station is subjected to baseband processing and then transmitted to the communication terminal 10.

In the data processing method, the communication method, the memory, the communication terminal, the communication device and the communication apparatus provided by the embodiments of the present disclosure, the communication terminal is controlled to turn off a communication module thereof configured to receive or transmit a first network signal, and transmit the uplink data to a communication device externally connected to the communication terminal, and downlink data received by the communication device is transmitted to the communication terminal, such that the communication terminal can receive or transmit a second network signal by means of the communication device externally connected thereto. Therefore, a communication terminal that does not have the 5G network communication function can perform communication in the 5G network with the aid of a communication device, and a user can experience the 5G network without replacing the communication terminal, thereby reducing the cost.

The data processing method, the communication method, the memory, the communication terminal, the communication device and the communication apparatus provided by the embodiments of the present disclosure are thus described above. In the embodiments of the present disclosure, an application program is stored in the communication terminal; and when the application program is executed by a processor, a communication module of the communication terminal is controlled to be turned off, and uplink data of the communication terminal is transmitted to a communication device externally connected to the communication terminal, so as to perform communication in the second network with the aid of the communication device. Therefore, for a communication terminal that only has the first network communication function but does not have the second network communication function, the communication terminal can receive or transmit the second network signal with the aid of the stored application program and the external communication device, so that the user can experience the second network without replacing the communication terminal, thereby reducing the cost.

It can be understood that the above embodiments are only exemplary embodiments used to illustrate the principles of the present disclosure, and the present disclosure is not limited thereto. For those skilled in the art, various modifications and improvements can be made without departing from the concept and essence of the present disclosure, and these modifications and improvements also fall within the scope of protection of the present disclosure.

The invention claimed is:

1. A data processing method, comprising:
obtaining uplink data of a communication terminal and controlling the communication terminal to turn off a communication module of the communication terminal, wherein the communication module comprises a baseband chip and is configured to receive or transmit a first network signal which is an M-th generation mobile communication network signal; and
transmitting the uplink data to a communication device externally connected to the communication terminal, and transmitting downlink data received by the communication device to the communication terminal, wherein the communication device is configured to receive or transmit a second network signal which is an N-th generation mobile communication network signal, where N>M, and N and M are both positive integers.

2. The data processing method of claim 1, further comprising, before the step of obtaining uplink data of a communication terminal and controlling the communication terminal to turn off a communication module of the communication terminal, wherein the communication module is configured to receive or transmit a first network signal:
sending a network signal application request, and performing, in response to a reception of a second network signal application instruction, the step of obtaining uplink data of a communication terminal and controlling the communication terminal to turn off a communication module of the communication terminal, wherein the communication module is configured to receive or transmit a first network signal.

3. The data processing method of claim 2, further comprising:
controlling, in response to a power-on instruction, a power supply of the communication terminal to supply power to the communication device externally connected to the communication terminal.

4. The data processing method of claim 2, further comprising:
controlling, in response to a power-off instruction, a power supply of the communication terminal to stop supplying power to the communication device externally connected to the communication terminal.

5. The data processing method of claim 1, further comprising:
controlling, in response to a power-on instruction, a power supply of the communication terminal to supply power to the communication device externally connected to the communication terminal.

6. The data processing method of claim 1, further comprising:
controlling, in response to a power-off instruction, a power supply of the communication terminal to stop supplying power to the communication device externally connected to the communication terminal.

7. A communication method applicable to a communication terminal comprising a processor and an application program, wherein the communication method comprises:
controlling, in response to a connection signal of a communication device, the processor to execute the application program which, when executed by the processor, causes the processor to perform operations comprising:
obtaining uplink data of a communication terminal and controlling the communication terminal to turn off a communication module of the communication terminal, wherein the communication module comprises a baseband chip and is configured to receive or transmit a first network signal which is an M-th generation mobile communication network signal, and
transmitting the uplink data to a communication device externally connected to the communication terminal, and transmitting downlink data received by the communication device to the communication terminal, wherein the communication device is configured to receive or transmit a second network signal which is an N-th generation mobile communication network signal, where N>M, and N and M are both positive integers.

8. The communication method of claim 7, further comprising: downloading and installing the application program locally in response to the connection signal of the communication device being received for the first time.

9. The communication method of claim 7 further comprising, before the operation of obtaining uplink data of a communication terminal and controlling the communication terminal to turn off a communication module of the communication terminal, wherein the communication module is configured to receive or transmit a first network signal:
sending a network signal application request, and performing, in response to a reception of a second network signal application instruction, the step of obtaining uplink data of a communication terminal and controlling the communication terminal to turn off a communication module of the communication terminal, wherein the communication module is configured to receive or transmit a first network signal.

10. The communication method of claim 7, further comprising:
controlling, in response to a power-on instruction, a power supply of the communication terminal to supply power to the communication device externally connected to the communication terminal.

11. The communication method of claim 7, further comprising:
controlling, in response to a power-off instruction, a power supply of the communication terminal to stop supplying power to the communication device externally connected to the communication terminal.

12. A non-transitory memory storing an application program which, when executed by a processor, causes the processor to perform a data processing method comprising:
obtaining uplink data of a communication terminal and controlling the communication terminal to turn off a communication module of the communication terminal, wherein the communication module comprises a baseband chip and is configured to receive or transmit a first network signal which is an M-th generation mobile communication network signal; and
transmitting the uplink data to a communication device externally connected to the communication terminal, and transmitting downlink data received by the communication device to the communication terminal, wherein the communication device is configured to receive or transmit a second network signal which is an N-th generation mobile communication network signal, where N>M, and N and M are both positive integers.

13. A communication terminal, comprising: an external data interface, a controller, a processor, and a non-transitory memory, wherein the external data interface is configured to be connected to an external communication device, and the controller is configured to control, in response to a connection signal of the communication device, the processor to execute an application program, the non-transitory memory storing the application program which, when executed by the processor, causes the processor to perform a data processing method comprising:
obtaining uplink data of a communication terminal and controlling the communication terminal to turn off a communication module of the communication terminal, wherein the communication module comprises a baseband chip and is configured to receive or transmit a first network signal which is an M-th generation mobile communication network signal; and
transmitting the uplink data to a communication device externally connected to the communication terminal, and transmitting downlink data received by the communication device to the communication terminal, wherein the communication device is configured to receive or transmit a second network signal which is an N-th generation mobile communication network signal, where N>M, and N and M are both positive integers.

14. A communication device, comprising: a data transfer interface, a baseband processing module and an antenna module, wherein:
the data transfer interface is configured to be connected to an external data interface of a communication terminal and to transfer data with the external data interface;
uplink data of the communication terminal comprises: information of a communication card, and data to be transferred;
the baseband processing module is configured to perform, according to the information of the communication card, baseband processing on the data to be transferred, to transfer the processed data to the antenna module, and to transfer downlink data received by the antenna module to the data transfer interface after the downlink data is subjected to baseband processing; and
the antenna module is configured to communicate with a base station by means of the second network signal.

15. The communication device of claim 14, further comprising:
a cache module configured to cache data to be transferred to the data transfer interface from the baseband processing module.

16. The communication device of claim 14, further comprising:
a notification module configured to issue a notification signal when the communication device is in a communication state.

17. The communication device of claim 9, wherein:
the external data interface of the communication terminal is detachably coupled to the data transfer interface of the communication device.

18. The communication apparatus of claim 17, further comprising:
a cache module configured to cache data to be transferred to the data transfer interface from the baseband processing module.

19. The communication apparatus of claim 17, further comprising:
a notification module configured to issue a notification signal when the communication device is in a communication state.

* * * * *